United States Patent
Tarimala et al.

(10) Patent No.: US 10,065,746 B2
(45) Date of Patent: Sep. 4, 2018

(54) DETERMINING VALIDITY OF LOCATION SIGNAL COMBINATIONS FOR SECURING UNMANNED AERIAL VEHICLE (UAV) NAVIGATION

(71) Applicant: Fortinet, Inc, Sunnyvale, CA (US)

(72) Inventors: Naga Kishore Reddy Tarimala, Bangalore (IN); Anil Kaushik, Bangalore (IN)

(73) Assignee: Fortinet, INc, Sunnyvale, CA (US)

( * ) Notice: Subject to any disclaimer, the term of this patent is extended or adjusted under 35 U.S.C. 154(b) by 88 days.

(21) Appl. No.: 15/194,503

(22) Filed: Jun. 27, 2016

(65) Prior Publication Data

US 2017/0369183 A1    Dec. 28, 2017

(51) Int. Cl.
| | |
|---|---|
| B64D 45/00 | (2006.01) |
| G01S 19/13 | (2010.01) |
| G01S 13/00 | (2006.01) |
| B64C 39/02 | (2006.01) |
| H04W 4/02 | (2018.01) |
| G05D 1/10 | (2006.01) |
| G01S 19/21 | (2010.01) |
| G01S 13/87 | (2006.01) |
| G08G 5/00 | (2006.01) |

(52) U.S. Cl.
CPC ........ B64D 45/0015 (2013.01); B64C 39/024 (2013.01); G01S 13/878 (2013.01); G01S 19/13 (2013.01); G01S 19/215 (2013.01); G05D 1/101 (2013.01); H04W 4/027 (2013.01); B64C 2201/141 (2013.01); B64D 2045/0055 (2013.01); G08G 5/0069 (2013.01)

(58) Field of Classification Search
None
See application file for complete search history.

(56) References Cited

U.S. PATENT DOCUMENTS

| | | | |
|---|---|---|---|
| 6,459,406 B1* | 10/2002 | Tseng .................. | B64G 1/24 |
| | | | 342/357.36 |
| 2015/0268350 A1* | 9/2015 | Whitehead ........... | G01S 19/215 |
| | | | 342/357.59 |
| 2016/0146944 A1* | 5/2016 | Geren .................. | G01S 19/215 |
| | | | 342/357.59 |
| 2016/0282473 A1* | 9/2016 | Driscoll ............... | G01S 19/49 |
| 2016/0299233 A1* | 10/2016 | Levien ................. | G01C 21/00 |
| 2017/0199269 A1* | 7/2017 | Allen .................. | G01S 5/10 |
| 2017/0227650 A1* | 8/2017 | Grobert .............. | G01S 19/215 |

* cited by examiner

Primary Examiner — Kevin P Mahne
(74) Attorney, Agent, or Firm — Law Office of Dorian Cartwright; Dorian Cartwright

(57) ABSTRACT

A navigation security module of an unmanned aerial vehicle (UAV) receives a combination of signals from a location technology, each signal comprising at least a signal identification and location data. The combination of signal identifications is processed against known identifications. If the identification is not found, or if the combination of signal identification is not possible, the signal may be a rogue signal, resulting in a quarantine protocol.

20 Claims, 7 Drawing Sheets

DETERMINING VALIDITY OF LOCATION SIGNAL COMBINATIONS FOR SECURING UNMANNED AERIAL VEHICLE (UAV) NAVIGATION

FIELD OF THE INVENTION

The invention relates generally to computer security, and more specifically, to determining the validity of location signal combinations for securing unmanned aerial vehicle (UAV) navigation.

BACKGROUND

Unmanned aerial vehicles (UAVs), or drones, aircraft without a human pilot aboard. Some drones are controlled by a remote control of a pilot on the ground, while others fly autonomously. Long range drones typically fly autonomously outside of the range possible for remote controls. In order to navigate to a specific destination, drones can receive location signals (e.g., GPS, cell towers, or access points) and use an onboard computer to determine a current position based on the signal using triangulation or other techniques. Current location, trajectory, and destination locations can all be taken into account for making steering adjustments.

However, these unmanned flights are vulnerable to attack by rogue location signals. For example, GPS is an open system that can be with known signatures that can faked in a spurious signal injected with bad location information. As a result, drones can be misdirected.

What is needed is a robust technique for securing UAV navigation by detecting rogue location signals. The solution can quarantine UAVs that have been compromised.

SUMMARY

The above-mentioned shortcomings are addressed by a navigation security system onboard a UAV for determining the validity of combinations of location signals.

In one embodiment, a navigation security module of a UAV receives a combination of signals from a location technology, each signal comprising at least a signal identification and location data. In an embodiment, the combination of signal identifications is processed against known identifications. If the identification is not found, or if the combination of signal identification is not possible, the signal may be a rogue signal. Heuristics-based techniques can also identify rogue signals.

In another embodiment, a combination of RSSI values are processed against known possible RSSI values for a given combination. Each signal can have an RSSI value representing signal strength which attenuates over distance. If the combination of RSSI values is not possible for the identified signals, the combination of signals can be invalidated.

In still another embodiment, a compromised UAV is quarantined. For example, the UAV can be safely landed at the next available opportunity. The UAV can ignore the comprised signals and use validated signals, such as the last validated signals, to find navigate to the landing location.

Advantageously, UAVs can avoid rogue location signals and compromised flight paths.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Hand-off control systems, computer-implemented methods, and (non-transitory) computer-readable mediums for navigation security onboard a UAV to determine the validity of combinations of location signals.

Figure 1A:
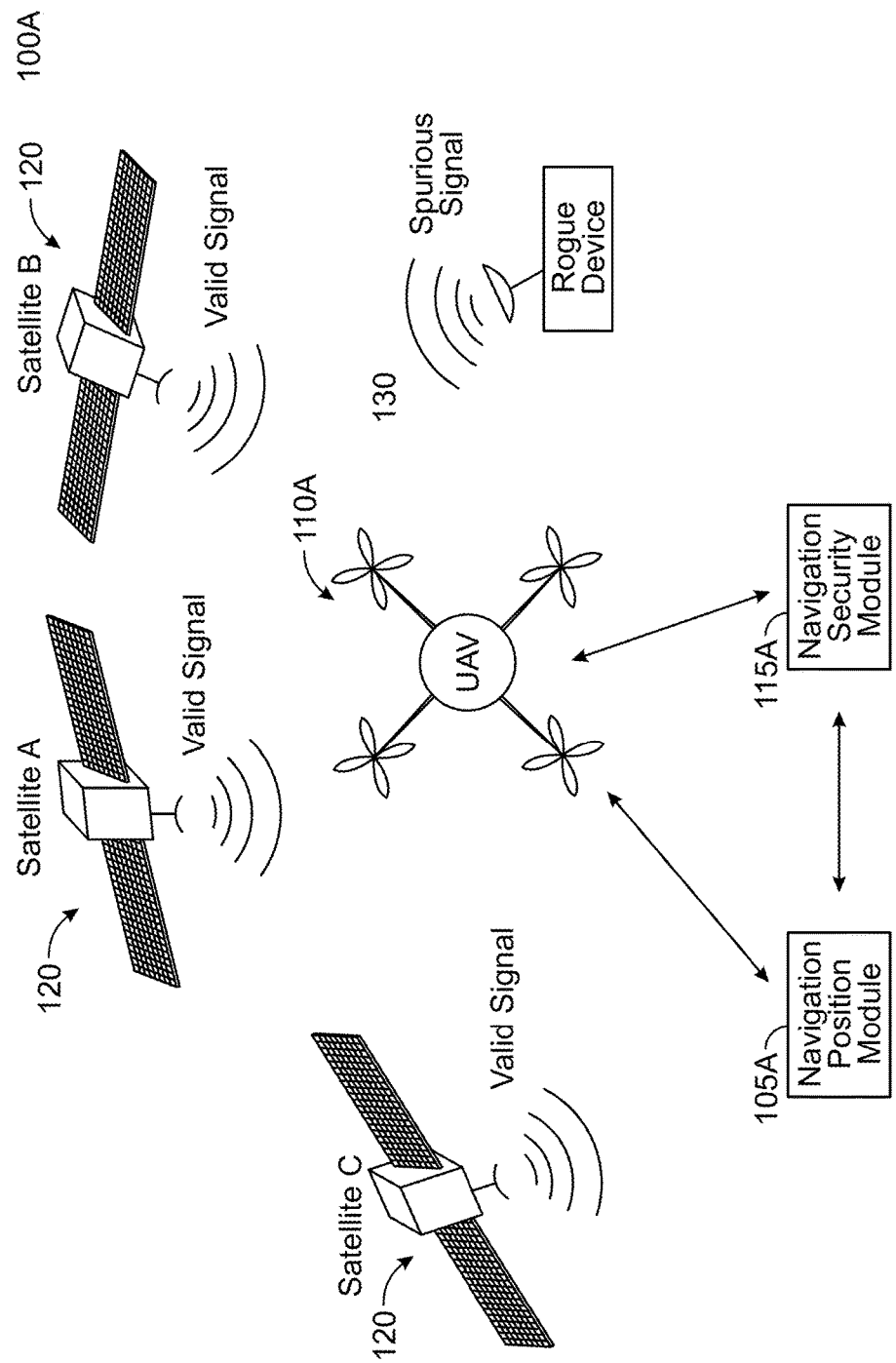
FIG. 1A is a high-level block diagram illustrating a navigation security system for determining validity of satellite location signal combinations, according to an embodiment.
Figure 1B:
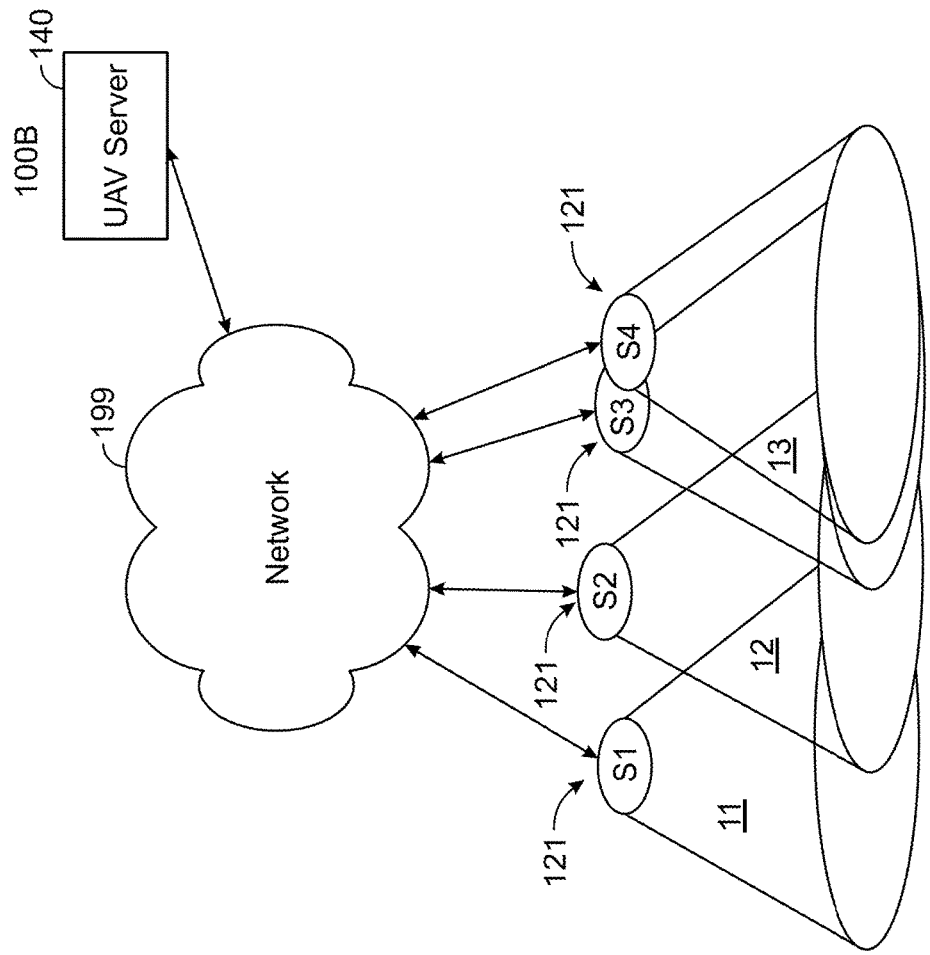
FIG. 1B is a high-level block diagram illustrating a navigation security system for determining validity of access point or cell tower location signal combinations, according to an embodiment.
Figure 1B:
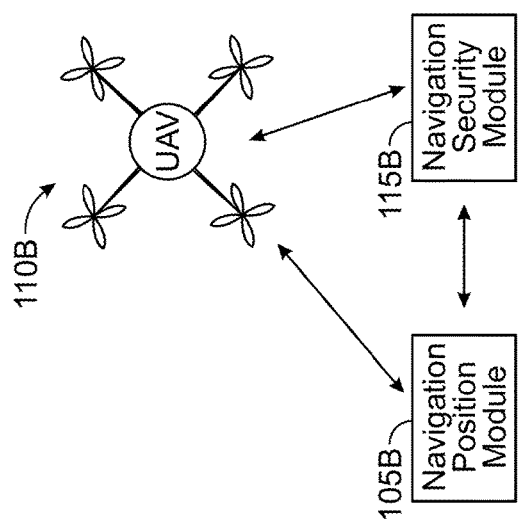
Figure 2:
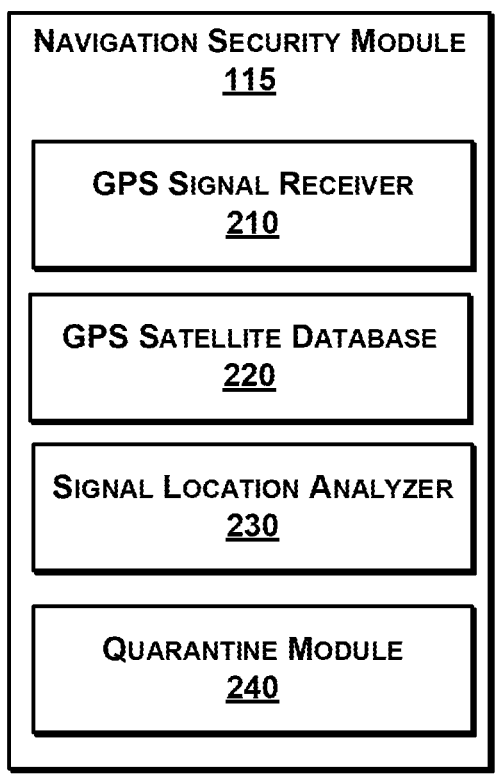
FIG. 2 is a more detailed block diagram illustrating a navigation security module of the system of FIG. 1, according to an embodiment.

Systems for UAV Navigation Security (FIGS. 1-2)

FIG. 1A is a high-level block diagram illustrating a navigation security system 100A for determining validity of satellite location signal combinations, according to an embodiment. The system 100A comprises a UAV 110AA, location satellites 120A-C, and rogue device 130. The UAV 110A receives wireless location signals from the satellites 120A-C, and also from the rogue device 130. Additional components can also be part of the system 100A, such as additional UAVs, additional satellites, and other components. The system 100A components can be implemented as hardware, software, or a combination of both.

The UAV 110A further comprises a navigation security module 115 to provide navigation security during autonomous flights. Therefore, as the UAV 110A traverses through a flight path using combinations of location signals at certain time to determine a current location and trajectory and in order to make necessary adjustments. Flights can be fully or partially autonomous. Security threats can be from the rogue device 130 or other components sending location signals that threaten a flight path. In one embodiment, responsive to detecting an invalid combination of location signals, the navigation security module 115 is able to quarantine a spurious location signal, or the UAV 110A from being further compromised.

For example, a product delivery service can use drones to automatically fly to a customer home and delivery a product. The drone is pre-programmed before take off to a specific flight path starting at a distribution center, landing at a customer home, and returning to the distribution center. During a leg of the flight path, a rogue satellite, access point, or cell tower signal can be used to disrupt the flight path or even to intercept the drone. Once the attack is detected, the drone can use the last location to estimate a return flight path or to make an emergency landing, for example. Drones can also be used for military, monitoring, weather observation, or any many other purposes.

The UAV 110A can be, for example a drone (e.g., by Parrot Inc.), an RC airplane, a quadcopter, an unmanned aircraft system (UAS), a remotely piloted aerial vehicle (RPAV), a remotely piloted aircraft system (RPAS), or any other flying device without a human pilot aboard. One embodiment of a drone includes a body, a power supply (e.g., lithium-polymer battery), an onboard computer (e.g. see FIG. 6), sensors (e.g., proprioceptive or exteroceptive sensors), actuators (e.g., propeller RPM controllers), software (e.g., real-time autopilot software), flight controls (e.g., lower layer control similar to manned aviation), and communications (e.g., antennae and wireless radio). The navigation security module 115 can be implemented by the onboard computer. An example of embodiment of the navigation security module 115 is set forth in more detail below in FIG. 2. An example of the onboard computer is discussed with respect to FIG. 6. Many other variations are possible.

The satellites 120 are preferably GPS satellites (e.g., 24 satellite constellation), in the current embodiment. Of course, other embodiments are implementable with different location or position technology. The GPS embodiment can be a NAVSTAR GPS satellite. The satellites 120 can be spaced-based, circling the Earth at an altitude of 12,000 miles or so. Positioning based on GPS typically relies upon four measurements, called trilateration: the first isolate a current location to a sphere, a second to narrow the current location to a circle, a third satellite reduces the circle to two possible points, and a fourth satellite selects between the two possible points and helps calculate timing. Other forms of position determination include triangulation which uses the measurement of absolute angles, trilateration discussed above, multilateration, or the like.

The navigation security module 115 identifies specific GPS satellites from identifications embedded within transmitted location signals. For instance, space vehicle numbers (SVNs) are serial numbers assigned to each GPS satellite, and pseudo-random noise sequences (PRNs) also differentiate satellites. The PRN codes can be a course acquisition (i.e., C/A code) or precision (P-code). The identifications are a stream of binary digits.

More generally, GPS satellites transmit two low power radio signals, designated L1 and L2. Civilian GPS uses the L1 frequency of 1,575.42 MHz in the UHF band and uses the L2 frequency of 1,227.60 MHz, at varying modulations to reduce interference. The signals travel by line of sight, meaning they will pass through clouds, glass and plastic but will not go through most solid objects such as buildings and mountains. There are 24 GPS satellites, on 6 orbital planes that orbit at 20 kilometers altitude.

The rogue device 130 can be an unauthorized satellite or other unauthorized computing device simulating the behavior of the satellites 120. In an embodiment, the rogue device 130 transmits a certain identification of an authorized satellite. Utilizing techniques described herein, the rouge device 130 is detected based on characteristics such as RSSI and expected location. The rouge device 130 can be operated by, for example, a hacker, a thief, a security administrator, or other individual or process.

FIG. 1B is a high-level block diagram illustrating a navigation security system 100B for determining validity of access point, cell tower, or RFID tag location signal combinations, according to an embodiment. A Wi-Fi based system can utilize signals over a IEEE 802.11 type of wireless network.

In contrast to the system 100A which relies upon satellites for positioning, the system 100B relies upon access points for positioning. More particularly, the system 100B comprises a UAV 110B communication with access points 121 in place of satellites 120. Alternatively, cell towers or other location devices can be implemented. The system 100B further comprises network 199 and a UAV server 140.

In an embodiment, the access points 121 have overlapping wireless coverage areas. The UAV 110 is configured with a Wi-Fi receiver rather than a satellite receiver. A first embodiment, extracts one or more BSSIDs from a beacon transmitted periodically to advertise a presence of the access points 121. The BSSID is converted to a search query to determine a location of the associated access point in order to estimate the UAV 110B location. As shown in FIG. 1B, location L1 provides a location from a single access point. Meanwhile, location L2 provides a more accurate location from two access points and location L3 provides the most accurate location from three access points. In one embodiment, the UAV 110 switches to different navigation modes based on how a number of access points within range. Some actions may be restricted from a navigation mode based on a single access point due to lack of available accuracy.

Conventionally, wireless stations respond to beacons as part of a protocol for authentication for the purpose of using the access points 121 to send and receive information over a wired network backbone. Because the access points 121 just need a BSSID as an identifier, authentication is not necessary in some embodiments. In other embodiments, the UAV 110B authenticates in order to communicate with the UAV server 140 or other data resource. One purpose of authenticating is to find out a location associated with an access point if not preconfigured in an onboard database.

FIG. 2 is a more detailed block diagram illustrating the navigation security module 115 (abstractly representing 115A and 115B), according to an embodiment. The navigation security module 115 of the present embodiment comprises a GPS signal receiver 210, a GPS satellite database 220, a signal location analyzer 230, and a quarantine module 240. Each of the components are implementable in hardware and/or software.

In one embodiment, the GPS signal receiver 210 comprises a GPS receiver that converts electromagnetic energy into a current. In more detail, a sequential GPS receiver can track GPS satellites using one or two hardware channels. Tracking one satellite at a time, the GPS receiver time tags measurements and combines them when all four satellite pseudo ranges have been measured. The signal receiver 210 can be a single-frequency code receiver, a single-frequency carrier=smoothed code receiver, a single-frequency code and carrier receiver, or a dual-frequency receiver.

The GPS satellite database 220 can be implemented as a simple list, a spreadsheet, a sequential database, or the like. Each GPS satellite includes an identification and an expected location. In some cases, the location is a function of time. The GPS satellite database 220 can be updated between flights or during flights through a data communication channel. In some cases, the GPS satellite database 220 includes combinations of satellite signals that are possible based on locations and/or combinations that are not possible based on locations. The combinations can be saved once calculated, in one case. Combinations, in some other cases, can be hardcoded to override a calculation.

The signal location analyzer 230, of one embodiment, determines whether a combination of received signals are expected. Many different formulas or algorithms can support a heuristic approach to analysis of the combinations. A set of rules can be coded into the signal location analyzer 230, or a use interface can allow user control over the rules for analysis. Factors such as location, signal strength, and RSSI can be taken into account. For example, out of four identically powered satellites, the satellite that is furthest away in distance should not have the strongest RSSI. Another example anomaly is an unidentified satellite not found in the GPS satellite database 220.

The quarantine module 240 takes ameliorative action against spurious signals from rogue devices. In one case, a drone can return to home. In another case, the drone can make an emergency landing. In still another case, the drone can destroy sensitive information. Other ameliorative actions include ignoring the spurious signal, using the last valid location, and reporting the rogue device. Various other actions can be utilized to prevent damage by the spurious signals.

Figure 3:
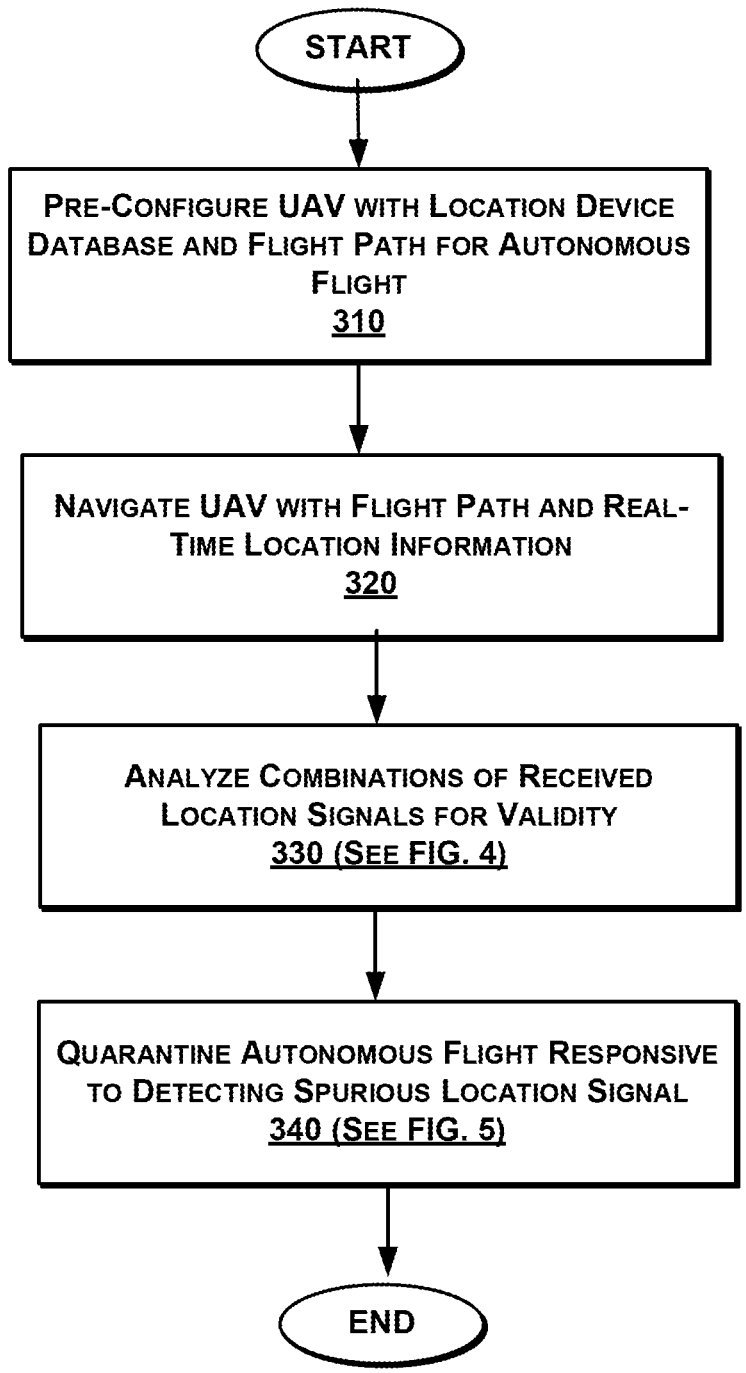
FIG. 3 is a high-level flow chart illustrating a method for determining validity of location signal combinations, according to an embodiment.
Figure 4:
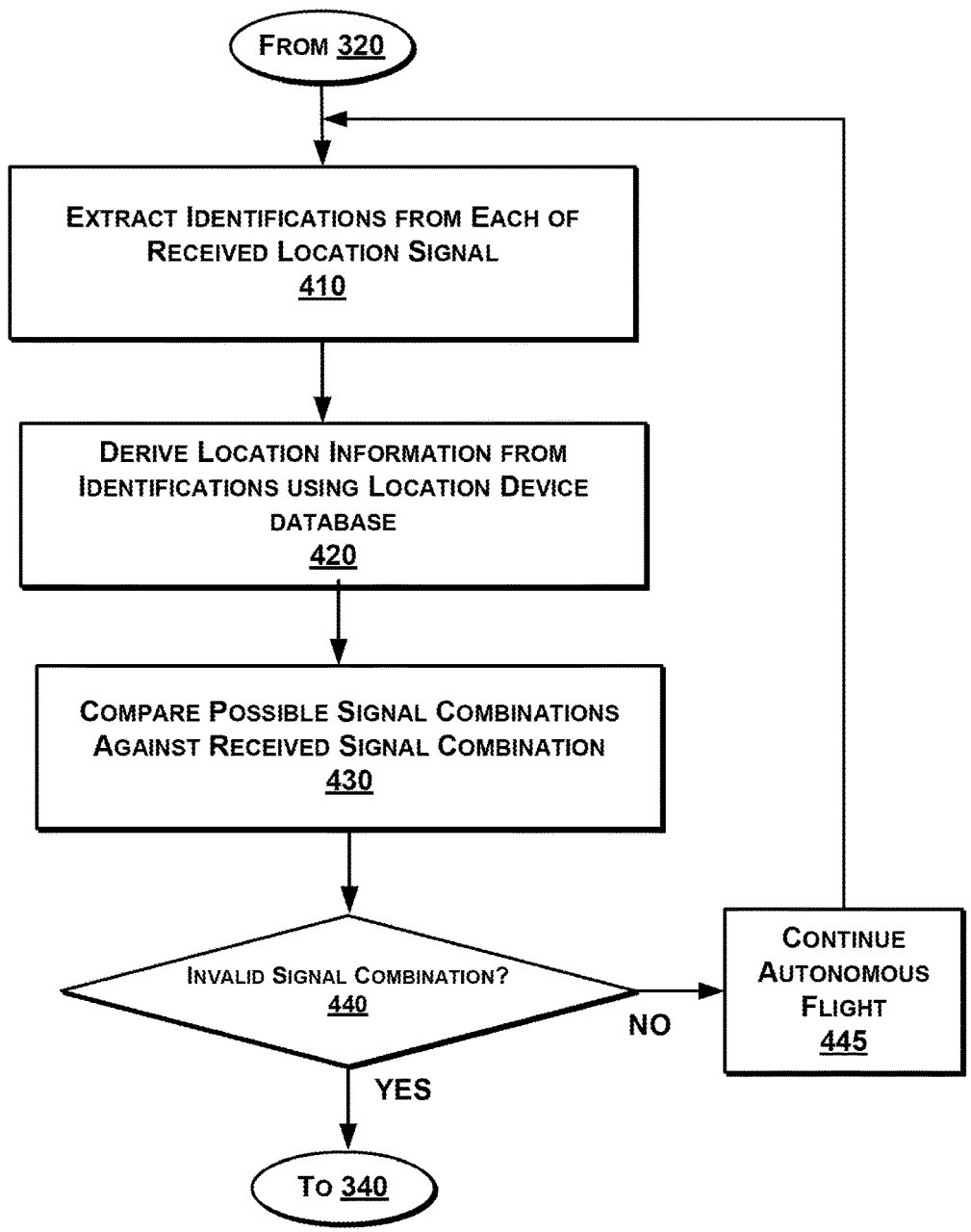
FIG. 4 is a more detailed flow chart illustrating a step of analyzing location signal combinations of the method of FIG. 3, according to an embodiment.
Figure 5:
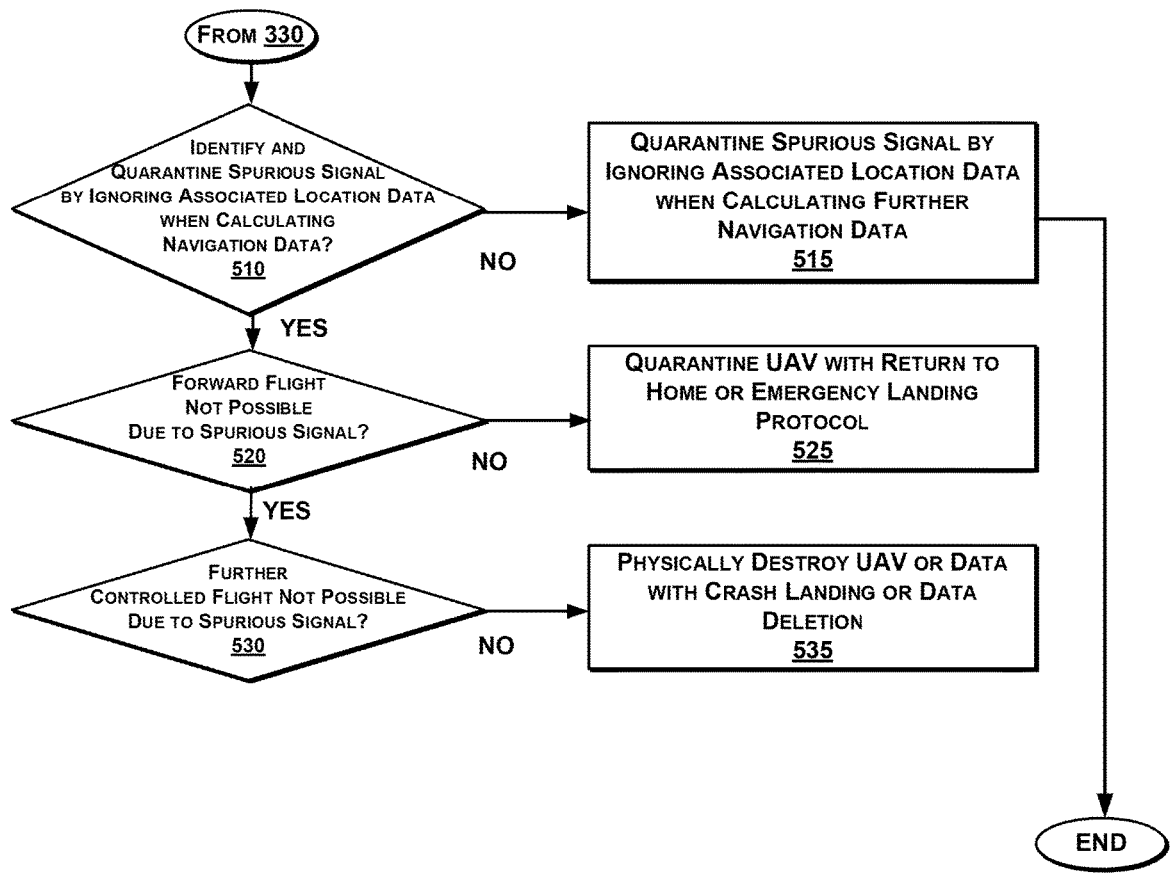
FIG. 5 is a more detailed flow chart illustrating a step of quarantining an autonomous UAV flight of the method of FIG. 3, according to an embodiment.

Methods for UAV Navigation Security (FIGS. 3-5)

FIG. 3 is a high-level flow chart illustrating a method for determining validity of location signal combinations, according to an embodiment. One of ordinary skill in the art will recognize that the method 300 is non-limiting as other embodiments can have more or less steps and can be performed in a different order. The method 300 can be implemented in the system 100A of FIGS. 1A,B or in other components.

A drone is pre-configured with a location device database and a flight path in preparation for an unmanned, autonomous flight (step 310). The flight path can be configured, for example, using Google Maps to select a departure location and an arrival location for automatic routing. Also, a custom route can be selected by designating coordinates. Other flight characteristics can be programmed, such a flight speed, duration, and height at certain locations. In one embodiment, known locations for spurious signals and rogue devices are avoided. In another embodiment, previous successful flight paths and paths having strong or reliable location signals are preferred even if lengthening the flight path.

The drone navigates during the flight using the flight path and current location, as detected from satellites (step 320). One preferred embodiment is triangulation, in which distances between a UAV and three different known locations intersect at the UAV location. The GPS satellite embodiment typically requires four different satellite locations out of 24 available. A single location can be used to derive a current location using distance along with a direction (e.g., 10 degrees east of north). Many other known location techniques can be substituted.

The integrity of the location information is also checked by analyzing combinations of received signals (step 330), as discussed further in FIG. 4.

Upon detecting a spurious location signal, the drone quarantines the autonomous flight (step 340), as detailed in FIG. 5.

FIG. 4 is a more detailed flow chart illustrating the step 330 of analyzing location signal combinations of the method 300 of FIG. 3, according to an embodiment.

Identifications are extracted from each of the received location signals (step 410). Location information is derived from the identifications using a location device database (step 420). For instance, a database query is formed from PRNs or SVNs to look up an associated location as a function of time. BSSIDs or cell tower locations are typically stationary, and thus, not a function of time, but can be in some implementations.

A list of possible combinations of location signals is compared against the received combination of location signals (step 430). A set of rules, in an embodiment, can be applied against the combination to determine validity. Combinations can be explicit or calculated in real-time. In one case, an access point at a suspect location may not even be able to transmit over the calculated distance. In another case, yields a current location or a trajectory that is deemed not possible based on a rate of change from previous measurements. Some cases involve a time element, such as when a GPS satellite combination is not possible at a particular time, but may be possible at a different time. Other implementation-specific rules are possible.

If the received combination is not found, it is deemed as not possible and invalid (step 440), otherwise it is deemed as possible and valid (445). Next, a spurious signal from the combination of received location signals is determined (step 450).

FIG. 5 is a more detailed flow chart illustrating the step 340 of quarantining an autonomous UAV flight of the method 300 of FIG. 3, according to an embodiment. This embodiment of the quarantining step 340 takes progressively aggressive security actions. One of ordinary skill in the art, given the following description, will be able to tailor additional quarantine protocols within the spirit of the present disclosure.

The spurious signal is quarantined by ignoring associated location data when calculating further navigation data (step 510) in order for a UAV to continue traveling to a destination (step 515). The UAV can return to a previous location and effectively ignore the new location until valid location data is available. However, the spurious signal may represent a choke point at which additional navigation is not possible (step 520), so the UAV can initialize a physical recovery routine, so the UAV itself is quarantined with a return to home or emergency landing navigation (step 525). For example, rogue device may not only send invalid data, but may also suppress valid signals, leaving a hole in necessary data to determine location for further travel. Also, the previous location may be stale because too much distance or time has passed to be dependable. If the spurious signal has, however, resulted in an irretrievable UAV (step 530), sensitive data can be deleted and/or the UAV can physically destroy itself with a crash landing or other technique (step 535).

Additionally, spurious signals can be reported during or after flights. One embodiment continues gathers additional information about a rogue device with interrogation messages.

Figure 6:
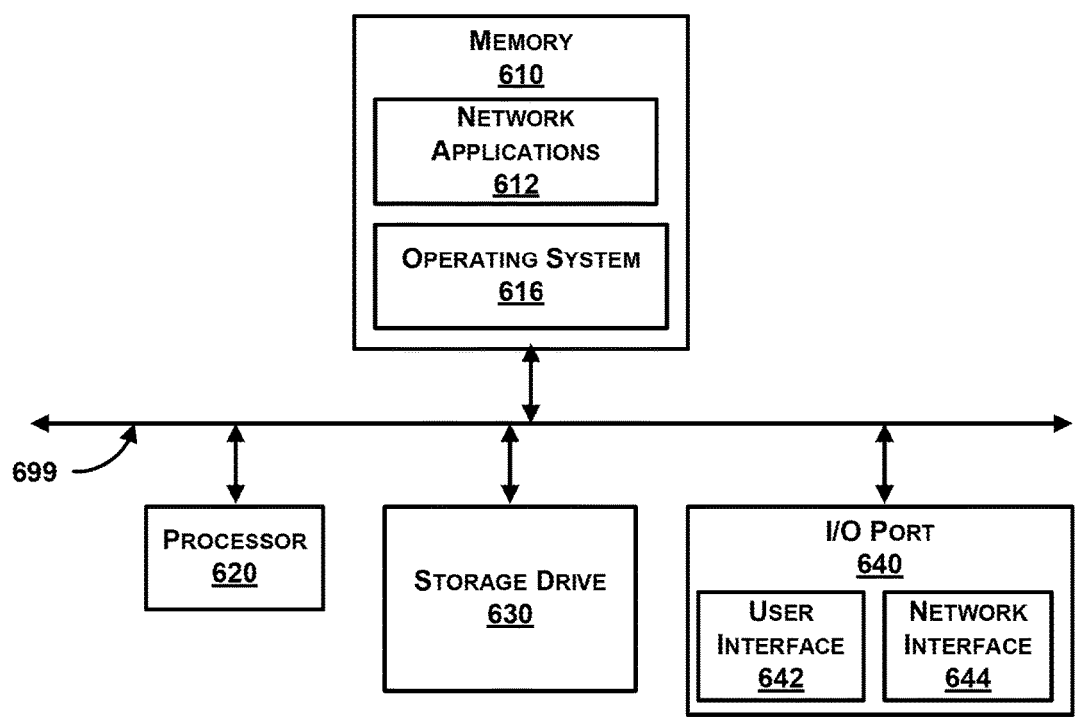
FIG. 6 is a block diagram illustrating an exemplary computing device, according to one embodiment.

Generic Computing Device (FIG. 6)

FIG. 6 is a block diagram illustrating an exemplary computing device 600 for use in the system 100A of FIG. 1, according to one embodiment. The computing device 600 is an exemplary device that is implementable for each of the components of the systems 100A and 100B, including the navigation security module 115 of FIG. 1. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the navigation security module 115. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, ME, Windows NT, Windows 2000, Windows XP, Windows XP x64 Edition, Windows Vista, Windows CE, Windows Mobile, Windows 8 or Windows 10), Linux, HP-UX, UNIX, Sun OS, Solaris, Mac OS X, Alpha OS, AIX, IRIX62, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an unmanned aerial vehicle (UAV) for securing navigation of unmanned flights by validating combinations of Global Positioning System (GPS) location signals, the method comprising the steps of:
   storing, in a memory device of the UAV, data about a database of GPS location devices comprising at least an identification and an expected location for each GPS location device;
   receiving, in a signal receiver device of a UAV, a plurality of location GPS signals from a plurality of GPS location devices, during an autonomous UAV flight, wherein each of the plurality of received GPS location signals comprise at least an identification;
   analyzing, by a processor of the UAV, a combination formed by the plurality of received GPS location signals to determine if the combination of received GPS location signals is possible based on expected locations of the GPS combination; and
   responsive to the GPS combination of received GPS location signals being deemed as not possible, quarantining, by the processor, at least one of the plurality of received GPS location signals from the autonomous UAV flight.

2. The method of claim 1, wherein:
   the step of receiving comprises receiving the plurality of GPS location signals at a specific time, and
   wherein the step of analyzing comprises analyzing the combination formed by the plurality of received GPS location signals at the specific time.

3. The method of claim 1, further comprising:
   determining that the at least one of the plurality of received GPS location signals comprises a spurious GPS location signal.

4. The method of claim 1, further comprising:
   determining a current location or a current trajectory by triangulating location data of the combination of received GPS location signals.

5. The method of claim 1, further comprising:
storing route data for the autonomous UAV flight; and
determining at least one navigation adjustment based on at least a current location or a current trajectory as determined from location data of the combination of received GPS location signals, relative to the route data.

6. The method of claim 1, further comprising:
determining a current location from the combination of received GPS location signals;
calculating a rate of change in location between the current location and at least one previous location;
responsive to the rate of location change being above a predetermined threshold, quarantining at least one of the combination of received GPS location signals from the autonomous UAV flight.

7. The method of claim 1, wherein the quarantining step comprises at least one of:
quarantining the UAV from the at least one of the plurality of received GPS location signals,
quarantining the UAV from the combination of received GPS location signals of the certain time, and
quarantining the UAV from all received GPS location signals.

8. The method of claim 1, wherein:
the step of analyzing comprises determining that at least one of the identifications of the received GPS location signals is invalid, and
wherein the step of quarantining comprises quarantining the at least one of the plurality of received GPS location signals having the invalid identification.

9. The method of claim 1, further comprising:
responsive to the combination of received GPS location signals being deemed as not possible, deleting a predetermined portion of data on a memory device of the UAV.

10. The method of claim 1, wherein the location signals comprise at least one of GPS signals, cellular signals, and Wi-Fi signals.

11. The method of claim 1, further comprising:
responsive to the combination of GPS location signals being deemed as possible, continuing the autonomous UAV flight.

12. The method of claim 1, wherein the UAV comprises at least one of an aircraft, a drone, and a remote control (RC) airplane.

13. A non-transitory computer-readable medium, storing instructions that, when executed by a processor, perform a method in an unmanned aerial vehicle (UAV) for securing navigation of unmanned flights by validating combinations of location signals, the method comprising the steps of:
storing, in a memory device of the UAV, data about a database of Global Positioning System (GPS) location devices comprising at least an identification and an expected location for each location device;
receiving, in a signal receiver device of a UAV, a plurality of location GPS signals from a plurality of GPS location devices, during an autonomous UAV flight, wherein each of the plurality of received GPS location signals comprise at least an identification;
analyzing, by a processor of the UAV, a combination formed by the plurality of received GPS location signals to determine if the combination of received GPS location signals is possible based on expected locations of the GPS combination; and
responsive to the GPS combination of received GPS location signals being deemed as not possible, quarantining, by the processor, at least one of the plurality of received GPS location signals from the autonomous UAV flight.

14. An unmanned aerial vehicle (UAV) for securing navigation of unmanned flights by validating combinations of location signals, the UAV comprising:
a memory device to sore data about a database of Global Positioning System (GPS) location devices comprising at least an identification and an expected location for each GPS location device;
a signal receiver device to receive a plurality of location signals from a plurality of GPS location devices, during an autonomous UAV flight, wherein each of the plurality of received GPS location signals comprise at least an identification;
a processor to analyze a combination formed by the plurality of received GPS location signals to determine if the combination of received GPS location signals is possible based on expected locations of the combination,
wherein responsive to the combination of received GPS location signals being deemed as not possible, the processor quarantines at least one of the plurality of received GPS location signals from the autonomous UAV flight.

15. The non-transitory computer-readable medium of claim 13, wherein the method further comprises:
the step of receiving comprises receiving the plurality of GPS location signals at a specific time, and
wherein the step of analyzing comprises analyzing the combination formed by the plurality of received GPS location signals at the specific time.

16. The non-transitory computer-readable medium of claim 13, wherein the method further comprises:
determining that the at least one of the plurality of received GPS location signals comprises a spurious location signal.

17. The non-transitory computer-readable medium of claim 13, wherein the method further comprises:
determining a current location or a current trajectory by triangulating location data of the combination of received GPS location signals.

18. The non-transitory computer-readable medium of claim 13, wherein the method further comprises:
storing route data for the autonomous UAV flight; and
determining at least one navigation adjustment based on at least a current location or a current trajectory as determined from location data of the combination of received GPS location signals, relative to the route data.

19. The non-transitory computer-readable medium of claim 13, wherein the method further comprises:
determining a current location from the combination of received GPS location signals;
calculating a rate of change in location between the current location and at least one previous location;
responsive to the rate of location change being above a predetermined threshold, quarantining at least one of the combination of received GPS location signals from the autonomous UAV flight.

20. The non-transitory computer-readable medium of claim 13, wherein the quarantining step of the method further comprises at least one of:

quarantining the UAV from the at least one of the plurality of received GPS location signals,
quarantining the UAV from the combination of received GPS location signals of the certain time, and
quarantining the UAV from all received GPS location signals.

\* \* \* \* \*